United States Patent
Khalil et al.

(10) Patent No.: US 8,624,543 B2
(45) Date of Patent: Jan. 7, 2014

(54) SWITCHING STRATEGY FOR SWITCHED RELUCTANCE MACHINE

(75) Inventors: Ahmed Khalil, Peoria, IL (US); Jackson Wai, Dunlap, IL (US); Jesse Gerdes, Dunlap, IL (US); James Siegle, Peoria, IL (US); Mark Hartman, Peoria, IL (US); Joshua Williams, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 200 days.

(21) Appl. No.: 13/315,853

(22) Filed: Dec. 9, 2011

(65) Prior Publication Data

US 2013/0147416 A1   Jun. 13, 2013

(51) Int. Cl.
*H02P 23/00* (2006.01)

(52) U.S. Cl.
USPC ...... 318/811; 318/599; 318/684; 318/400.07; 318/400.15; 318/701; 322/10; 322/23; 322/29; 322/44; 322/94; 363/41; 363/149

(58) Field of Classification Search
USPC ............... 318/811, 599, 684, 400.07, 400.15, 318/701; 322/23, 10, 29, 44, 94; 363/149, 363/41
See application file for complete search history.

(56) References Cited

U.S. PATENT DOCUMENTS

| | | | | |
|---|---|---|---|---|
| 3,971,972 | A | * | 7/1976 | Stich ........................... 318/811 |
| 5,032,771 | A | * | 7/1991 | Kerkman et al. ............. 318/52 |
| 5,959,419 | A | * | 9/1999 | Sugiyama .................... 318/293 |
| 6,269,013 | B1 | | 7/2001 | Honma et al. |
| 6,661,206 | B2 | | 12/2003 | Gallegos-Lopez |
| 7,080,026 | B2 | | 7/2006 | Singh et al. |
| 7,213,007 | B2 | | 5/2007 | Grichnik |
| 2002/0024316 | A1 | | 2/2002 | Honma et al. |
| 2003/0107342 | A1 | * | 6/2003 | Gallegos-Lopez ........... 318/701 |
| 2003/0210009 | A1 | * | 11/2003 | Minciunescu ................ 318/599 |
| 2009/0021204 | A1 | | 1/2009 | Norell et al. |
| 2012/0145472 | A1 | * | 6/2012 | Imamura et al. ............. 180/446 |

FOREIGN PATENT DOCUMENTS

| JP | 2010206872 | | 9/2010 |
|---|---|---|---|
| JP | 2010206872 | A * | 9/2010 |

* cited by examiner

*Primary Examiner* — Lincoln Donovan
*Assistant Examiner* — Jorge Carrasquillo
(74) *Attorney, Agent, or Firm* — Miller, Matthias & Hull

(57) ABSTRACT

A method of controlling a motor is provided. The method may determine a speed of the motor, and engage a soft chopping routine on a first switch and a second switch of each phase if the motor speed is relatively low. The first switch may be driven by a first pulse width modulated PWM signal and the second switch being driven by a second PWM signal. The first and second PWM signals may be alternatingly configured such that at least one of the first switch and the second switch is closed at any point during the distributed soft chopping routine and both the first switch and the second switch are never simultaneously open.

16 Claims, 4 Drawing Sheets

SWITCHING STRATEGY FOR SWITCHED RELUCTANCE MACHINE

TECHNICAL FIELD

The present disclosure relates generally to electric motors, and more particularly, to systems and methods of controlling the switching routine of a switched reluctance motor operating in a low speed motoring mode.

BACKGROUND

With the growing interest in energy conservation, increasingly more industrial work machines are supplied with electric drive assemblies or systems for driving the work machine and operating its various tools or functions. Ongoing developments in electric drives have made it possible for electrically driven work machines to effectively match or surpass the performance of mechanically driven work machines while requiring significantly less fuel and overall energy. As electric drives become increasingly more commonplace with respect to industrial work machines, and the like, the demands for more efficient generators and techniques for controlling same have also increased.

An electric motor of an electric drive machine is typically used to convert mechanical power received from a primary power source, such as a combustion engine, into electrical power for performing one or more operations of the work machine. Additionally, an electric motor may be used to convert electrical power stored within a common bus or storage device into mechanical power. Among the various types of electric motors available for use with an electric drive system, switched reluctance motors have received great interest for being robust, cost-effective, and overall, more efficient. While currently existing systems and methods for controlling switched reluctance motors provide adequate control, there is still room for improvement.

Typical control schemes for switched reluctance motors may involve operating two switches of each phase of the motor in one of two general operating modes, for example, single pulse and current regulation modes of operation. Single pulse modes are directed toward higher speed tasks requiring more power output, while current regulation modes are directed toward lower speed tasks requiring more torque output from a driven machine. Moreover, among typical current regulation modes, nominal speed tasks may be operated by hard chopping current to the two switches of each phase, while relatively lower speed tasks may be operated by soft chopping current to the two switches of each phase.

A hard chopping routine sources a pulsed phase current by simultaneously opening and closing both switches of each phase at the required frequency, whereas a soft chopping routine sources soft pulsed phase current by holding a first switch closed while opening and closing only a second switch at the required frequency. Soft chopping routines repeatedly subject significant thermal stress upon only one of the two switches in a phase leg. The added burden to such switches can result in premature failures in the associated power converter circuit. Such failures in the power converter circuit may in turn cause premature failures in the electric drive system and thus prevent work machines and other related tools to achieve initial performance requirements.

Accordingly, there is a need to improve the overall efficiency and functionality of an electric drive system. Moreover, there is a need to improve the switching routine or strategy associated with operating a switched reluctance motor during a motoring mode in high current, high load situations, such as at zero to low speeds. Furthermore, there is a need to more efficiently engage switches of a phase leg during soft chopping routines so as to prolong the life of the switches and of the overall electric drive system.

SUMMARY OF THE DISCLOSURE

In one aspect of the present disclosure, a method of controlling a motor is provided. The method may determine a speed of the motor, and engage a soft chopping routine on a first switch and a second switch of each phase if the motor speed is relatively low. The first switch may be driven by a first pulse width modulated (PWM) signal and the second switch may be driven by a second PWM signal. The first and second PWM signals may be alternatingly configured such that at least one of the first switch and the second switch is closed at any point during the distributed soft chopping routine and both the first switch and the second switch are never simultaneously open.

In a refinement, the first and second PWM signals may be distinct.

In another refinement, the motor may be a low to medium voltage three-phase switched reluctance motor operable in one of a generating mode and a motoring mode of operation.

In a related refinement, the distributed soft chopping routine may be engaged during the motoring mode of operation.

In yet another refinement, relatively low motor speeds may correspond to motor speeds approximately ranging between zero and a base speed. The base speed may be a maximum speed at which the motor is able to output constant torque before torque output begins to decrease proportionally with motor speed.

In a related refinement, the method may further engage a single pulse routine on the first switch and the second switch if the motor speed is relatively high, and engage a hard chopping routine on the first switch and the second switch if the motor speed is nominal. Relatively high motor speeds may be approximately greater than the base speed and nominal motor speeds may approximate the base speed.

In another aspect of the present disclosure, a control system for a motor is provided. The control system may include a converter circuit operatively coupled to a stator of the motor, and a controller in communication with each of the motor and the converter circuit. The converter circuit may include at least a first switch and a second switch coupled to each phase of the stator. The controller may be configured to determine a motor speed, and engage the first switch and the second switch with a soft chopping routine during a motoring mode of operation at relatively low motor speeds. The first switch and the second switch may be driven by alternating signals such that both the first switch and the second switch are never simultaneously open.

In a refinement, the controller may be configured to generate a first PWM signal for driving the first switch and a second PWM signal for driving the second switch during the distributed soft chopping routine, wherein the first PWM signal may be distinct from the second PWM signal.

In a related refinement, the controller may be configured to alternate the first and second PWM signals such that at least one of the first switch and the second switch is closed at any point during the distributed soft chopping routine.

In another refinement, the converter circuit may include insulated-gate bipolar transistor switches.

In another refinement, the soft chopping routine may be preprogrammed in a memory accessible to the controller.

In another refinement, the controller may be adapted for use with an electric drive having a low to medium voltage three-phase switched reluctance motor operable in one of a generating mode and a motoring mode.

In yet another refinement, the controller may be further configured to engage the first switch and the second switch with a hard chopping routine if the motor speed is nominal, and engage the first switch and the second switch with a single pulse routine if the motor speed is relatively high. Relatively low motor speeds may correspond to motor speeds approximately ranging between zero and a base speed. Nominal motor speeds may approximate the base speed. Relatively high motor speeds may correspond to motor speeds approximately greater than the base speed. The base speed may be a maximum speed at which the motor is able to output constant torque before torque output begins to decrease proportionally with motor speed.

In yet another aspect of the present disclosure, an electric drive system is provided. The electric drive system may include an electric motor having a rotor and a stator, a converter circuit in communication with the motor, and a controller in communication with each of the motor and the converter circuit. Each of the rotor and the stator may have a plurality of phases, and the converter circuit may include at least a first switch and a second switch coupled to each phase of the stator. The controller may be configured to determine a motor speed, and engage the first switch and the second switch with a soft chopping routine during a motoring mode of operation at relatively low motor speeds. The first switch and the second switch may be driven by alternating signals such that both the first switch and the second switch are never simultaneously open.

In a refinement, the controller may be configured to generate a first PWM signal for driving the first switch and a second PWM signal for driving the second switch during the distributed soft chopping routine, wherein the first PWM signal may be distinct from the second PWM signal.

In a related refinement, the controller may be configured to alternate the first and second PWM signals such that at least one of the first switch and the second switch is closed at any point during the distributed soft chopping routine.

In another refinement, the soft chopping routine may be preprogrammed in a memory accessible to the controller.

In another refinement, the motor may be a low to medium voltage three-phase switched reluctance motor operable in one of a generating mode and a motoring mode.

In yet another refinement, the controller may be further configured to engage the first switch and the second switch with a hard chopping routine if the motor speed is nominal, and engage the first switch and the second switch with a single pulse routine if the motor speed is relatively high. Relatively low motor speeds may correspond to motor speeds approximately ranging between zero and a base speed. Nominal motor speeds may approximate the base speed. Relatively high motor speeds may correspond to motor speeds approximately greater than the base speed. The base speed may be a maximum speed at which the motor is able to output constant torque before torque output begins to decrease proportionally with motor speed.

In a related refinement, the controller may be configured to select one of the single pulse, hard chopping and distributed soft chopping routines based at least partially on the detected motor speed and using one or more control maps preprogrammed in a memory accessible to the controller.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
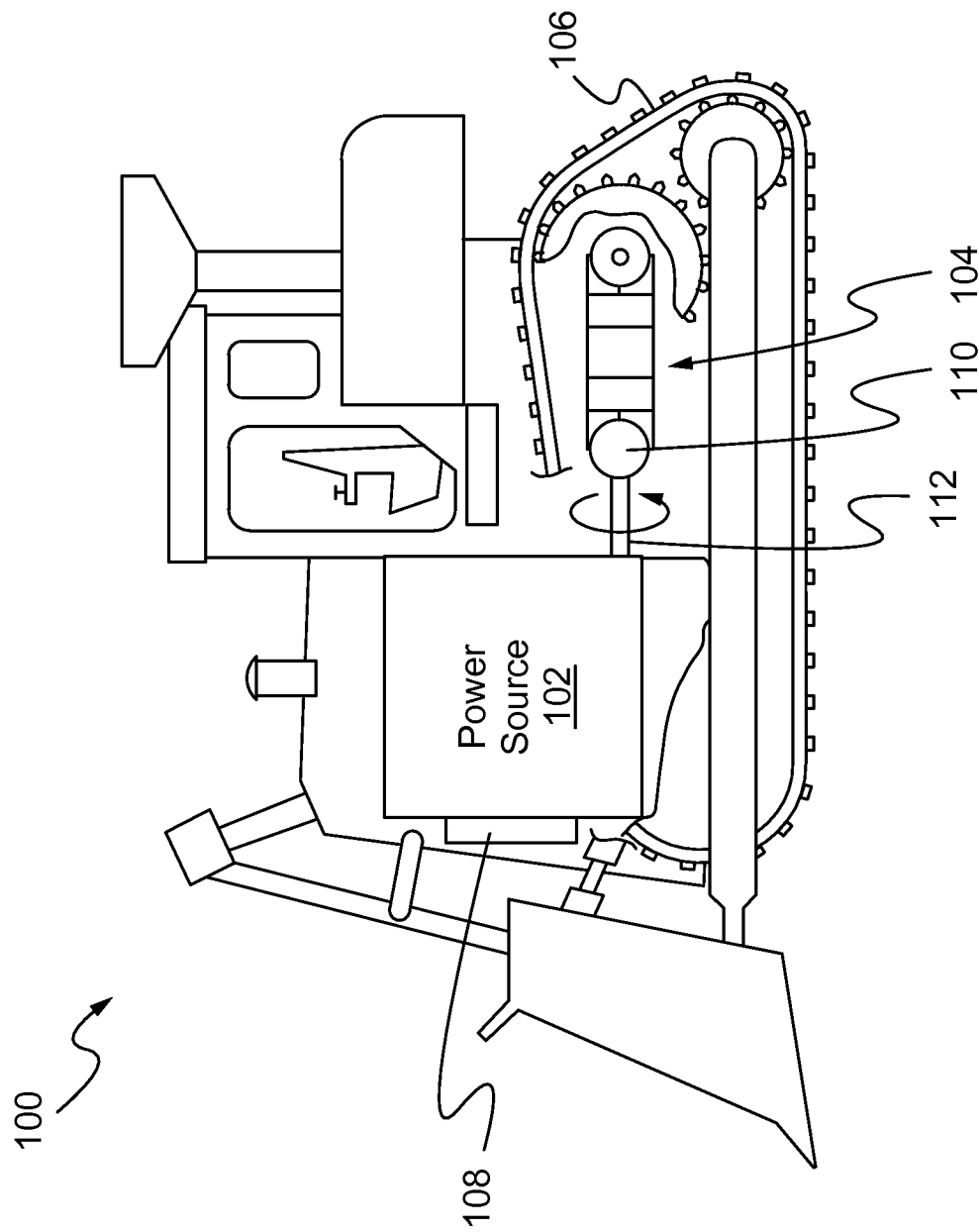
FIG. 1 is a diagrammatic view of one exemplary machine with an electric drive system.

FIG. 1 diagrammatically illustrates a mobile machine 100 that may employ electric drive means for causing movement. More specifically, the machine 100 may include a power source 102 coupled to an electric drive system 104 for causing movement via a traction device 106. Such a mobile machine 100 may be used as a work machine for performing a particular type of operation associated with an industry, such as mining, construction, farming, transportation, or any other suitable industry known in the art. For example, the machine 100 may be an earth moving machine, a marine vessel, an aircraft, a tractor, an off-road truck, an on-highway passenger vehicle, or any other mobile machine. The power source 102 of the electric drive 104 may include, for example, a diesel engine, a gasoline engine, a natural gas engine, or any other type of combustion engine commonly used for generating power. The engine 102 may be configured to mechanically transmit power to a generator or an electric motor 110 of the electric drive 104 via a coupling or axially rotating drive shaft 112.

Figure 2:
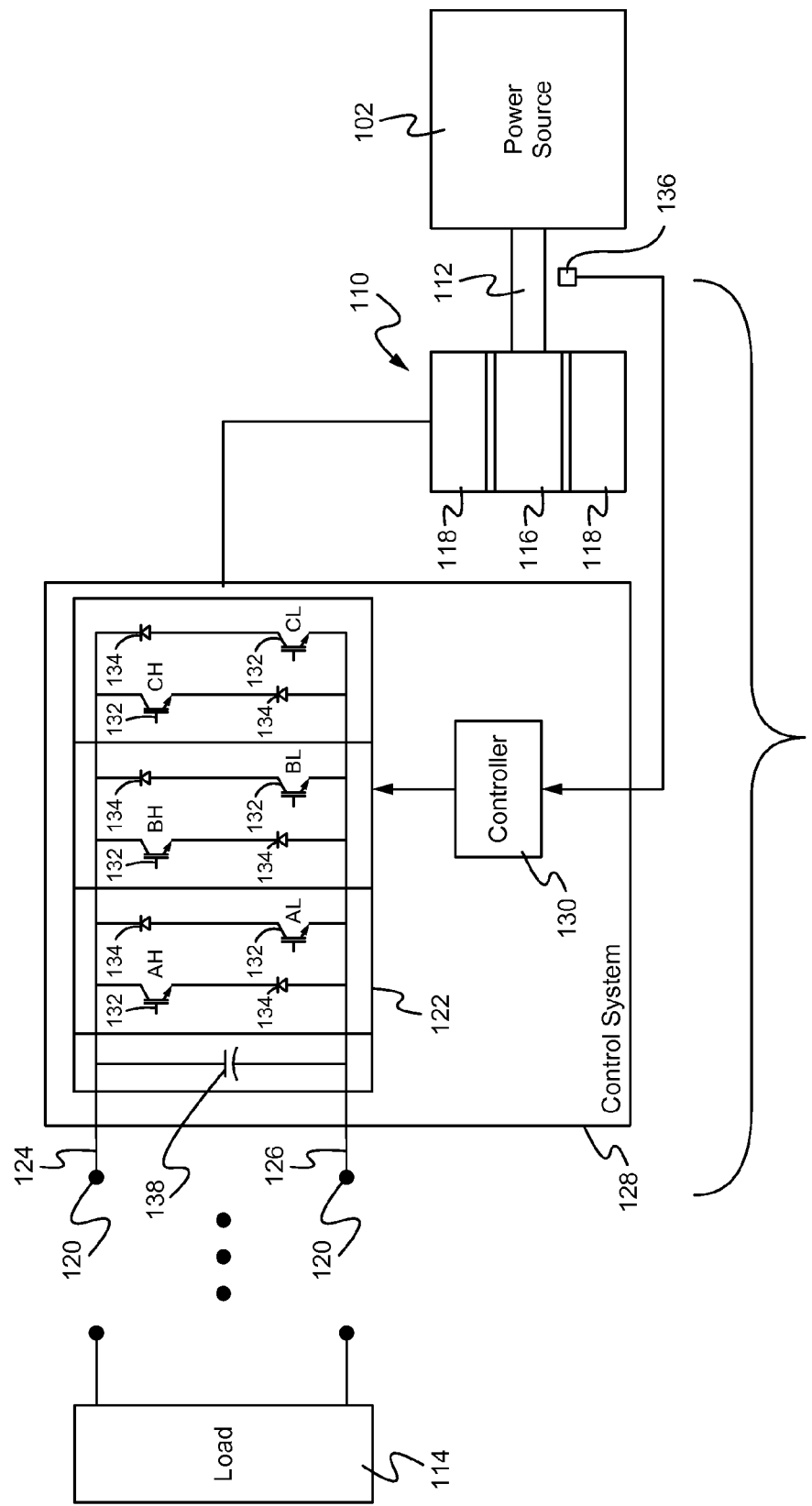
FIG. 2 is a schematic view of an exemplary control system for an electric drive constructed in accordance with the teachings of the present disclosure.

FIG. 2 schematically illustrates one exemplary electric drive system 104 that may be employed to communicate power between the engine 102 and one or more electrical loads 114. The motor 110 of the electric drive 104 in FIG. 2 may be a switched reluctance motor, or the like, configured to produce electrical power in response to rotational input from the engine 102 and communicate the electrical power to one or more electrical loads 114 of the machine 100. The load 114 may include, for example, motors for causing motion of the machine 100 as well as motors for operating various mechanical tools of the machine 100. As is well known in the art, the motor 110 may include a rotor 116 that is rotatably disposed within a fixed stator 118. The rotor 116 may be coupled to an output of the engine 102 via the drive shaft 112, or in other related embodiments, via a direct crankshaft, a gear train, a hydraulic circuit, and the like. The stator 118 may be electrically coupled to a common bus 120 of the electric drive 104 via a converter circuit 122.

During a generating mode of operation, as the rotor 116 is rotated within the stator 118 by the engine 102, electrical current may be induced within the stator 118 and supplied to the converter circuit 122. The converter circuit 122 may in turn convert the electrical signals into an appropriate direct current (DC) voltage for distribution to the various electrical loads 114 of the machine 100. Additionally, the motor 110 may be enabled to cause rotation of the rotor 116 in response to electrical signals that are provided to the stator 118 from the common bus 120, for instance, during a motoring mode of operation. The common bus 120 may include a positive line 124 and a negative or ground line 126 across which a common DC bus voltage may be communicated to one or more loads 114 of the machine 100 coupled thereto. For instance, the converter circuit 122 may provide a DC signal to be transmitted through the common bus 120 and to a rectifier circuit where the DC voltage may be converted into the appropriate alternating current (AC) signals for driving the one or more traction motors, or the like, for causing motion of the machine 100 via the traction device 106. The common bus 120 may also communicate the common DC voltage to other loads 114 of the machine 100, such as a hybrid system, electrically driven pumps, electrically driven fans, and the like.

Still referring to FIG. 2, the electric drive 104 may also include a control system 128 for controlling the motor 110. The control system 128 may essentially include a controller 130 that is in communication with at least the converter circuit 122 associated with the electric drive 104. The converter circuit 122 may include a series of transistors or gated switches 132, such as insulated-gate bipolar transistors, and diodes 134 for selectively enabling one or more phase windings of the motor 110. A three-phase switched reluctance motor 110, for example, may be driven using a converter circuit 122 having six switches 132 and six diodes 134 for selectively enabling or disabling each of the three phase legs of the motor 110. Each of the switches 132 may be enabled or disabled via gate signals, which may be supplied by the controller 130. In particular modifications, the control system 128 may also be provided with encoders, speed sensors 136, or the like, adapted to generate a speed sensor signal corresponding to the rotational position and/or frequency of the rotor 116 relative to the stator 118 and communicate the speed sensor signal to an input of the controller 130. The speed sensors 136 may include a Hall-effect sensor, a variable reluctance sensor, an anisotropic magnetoresistance sensor, or the like. Power to the control system 128 and the converter circuit 122 may be provided by an external or secondary power source, such as provided by a battery (not shown), residual voltage stored in a capacitor 138 of the common bus 120, or any other suitable current limited DC power supply.

The controller 130 of FIG. 2 may be implemented using one or more of a processor, a microprocessor, a microcontroller, an electronic control module (ECM), an electronic control unit (ECU), or any other suitable means for providing electronic control to the electric drive system 104. More specifically, the controller 130 may be configured to operate the motor 110 of the electric drive 104 according to a predetermined algorithm or set of instructions designed to optimize the performance of the machine 100 based on observed characteristics of the motor 110, the engine 102, the electric drive 104, and the like. For example, the controller 130 may be preprogrammed to determine the mode of operation for a switched reluctance motor 110 best suited for an observed motor speed, load characteristics and/or phase current requirements. Moreover, based on the observed parameters, the controller 130 may adjust the phase current supplied to each phase leg of the motor 110 so as to operate the motor 110 in any one of a single pulse mode, current regulation mode, hard chopping mode, a soft chopping mode, and the like. Such algorithms may additionally or alternatively include predefined control maps or lookup tables which may suggest to the controller 130 a predefined control scheme that best corresponds to a given situation and optimizes performance. Algorithms or sets of instructions and conditionals may be preprogrammed or incorporated into a memory of the controller 130 by means commonly known in the art.

Figure 3:
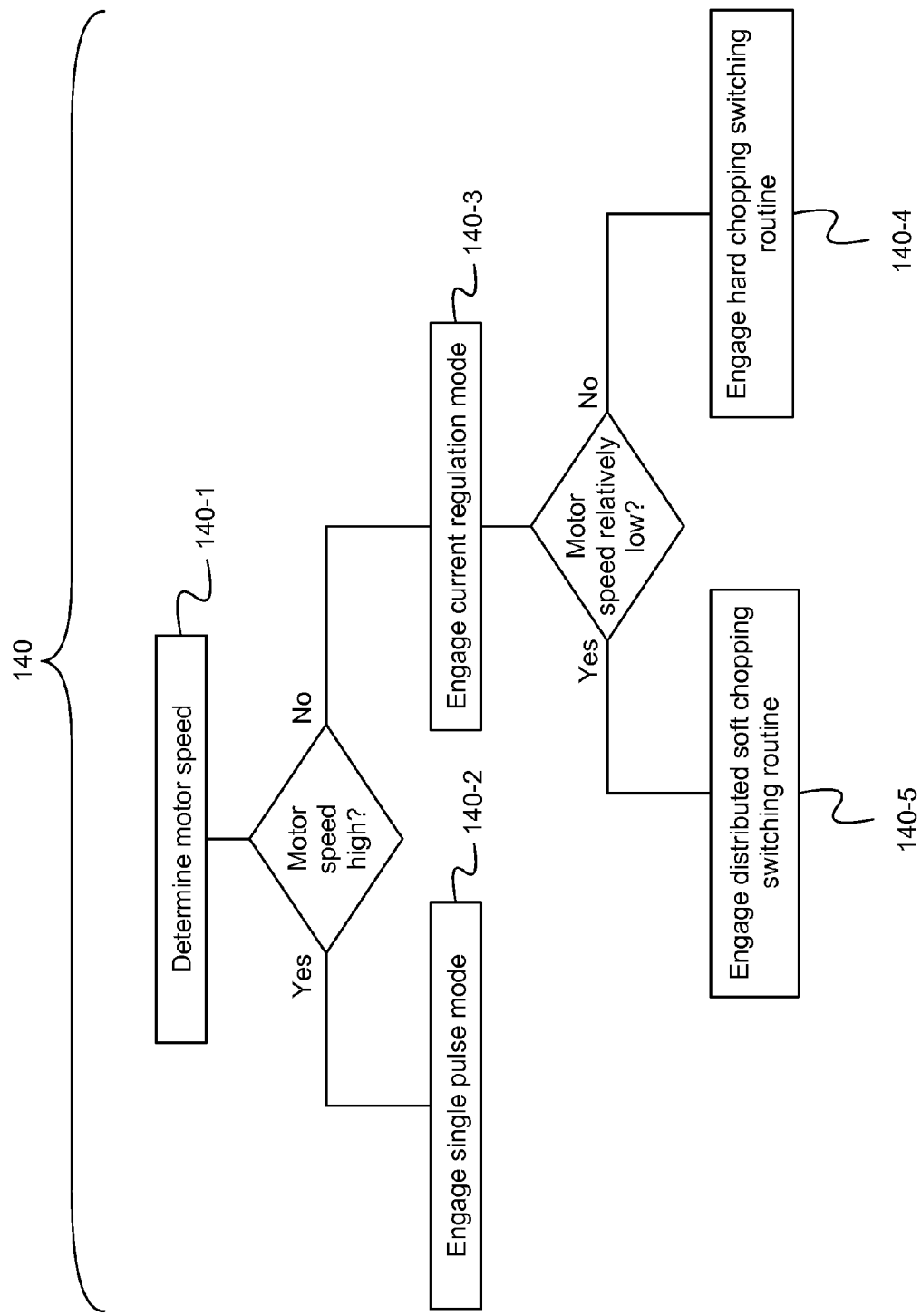
FIG. 3 is a flow diagram of one exemplary method of controlling a motor.

Referring now to FIG. 3, a flow diagram of an exemplary algorithm or method 140 by which the controller 130 may be configured to drive a motor 110 in a motoring or propulsion mode of operation is provided. As shown, in an initial step 140-1, the controller 130 may be configured to determine a current motor speed. More specifically, the controller 130 may monitor and compare the observed speed with one or more predefined speed thresholds or a range of thresholds to determine if the motor speed corresponds to a relatively high speed, a nominal or mid-range speed, a relatively low speed, or the like. Such motor speed thresholds may be distinguished based on a base speed. While the base speed for any particular motor 110 and/or application may vary with the load that is applied, the base speed may generally be defined as the maximum speed at which the motor 110 is able to output constant torque before torque output begins to decrease proportionally with motor speed. Relatively low motor speeds may be designated to range approximately between zero and base speeds, while relatively high motor speeds may be designated as motor speeds approximately exceeding the base speed. Nominal motor speeds may approximately correspond to the base speed.

If the observed speed is observed to be relatively high, the controller 130 may be configured to engage a single pulse mode of operating the motor 110 in step 140-2. During the single pulse mode of step 140-2, the controller 130 may transmit gate signals configured to continuously enable or close both of the switches 132 of the converter circuit 122 associated with each phase leg of the motor 110 so as to operate the motor 110 in a substantially constant power range of output. Alternatively, if the observed speed is observed to be nominal or relatively low, the controller 130 may be configured to engage a current regulation mode of operating the motor 110 in step 140-3.

During current regulation mode, the controller 130 may be configured to further distinguish whether the observed motor speed corresponds to a nominal or a relatively low motor speed. As in previous conditions, the controller 130 may distinguish between nominal and relatively low motor speeds based on one or more predefined speed thresholds or a range of thresholds. If the observed speed corresponds to a nominal motor speed, the controller 130 may engage a hard chopping switching routine in step 140-4. During the hard chopping routine, the controller 130 may transmit gate signals configured to pulse current through the phase legs of the motor 110 by simultaneously switching, opening and closing, both of the switches 132 for each phase of the motor 110 at a required frequency. Such a hard chopping routine may drive the motor 110 to generate a substantially constant torque range of output. Alternatively, if the observed speed corresponds to a relatively low motor speed, the controller 130 may be configured to engage a soft chopping switching routine in step 140-5. For example, during step 140-5, the controller 130 may transmit gate signals configured to alternatingly switch one of the two switches 132 of a phase leg of a switched reluctance motor 110 at a required frequency while the remaining switch is held in the closed state.

Figure 4:
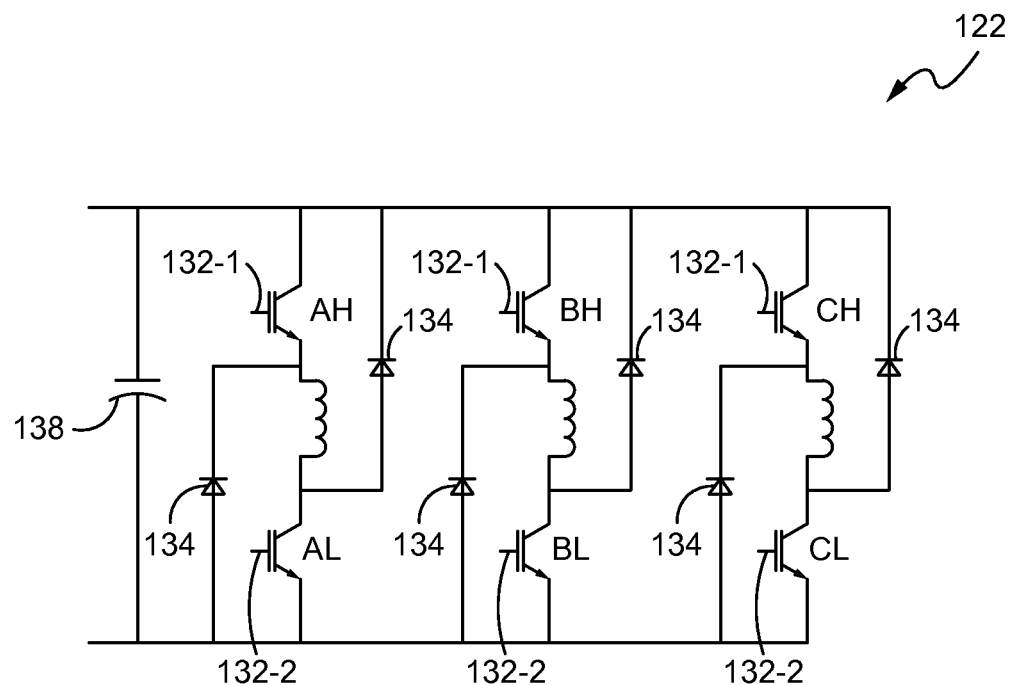
FIG. 4 is a schematic view of an exemplary power converter circuit for a low to medium voltage switched reluctance motor.
Figure 5:
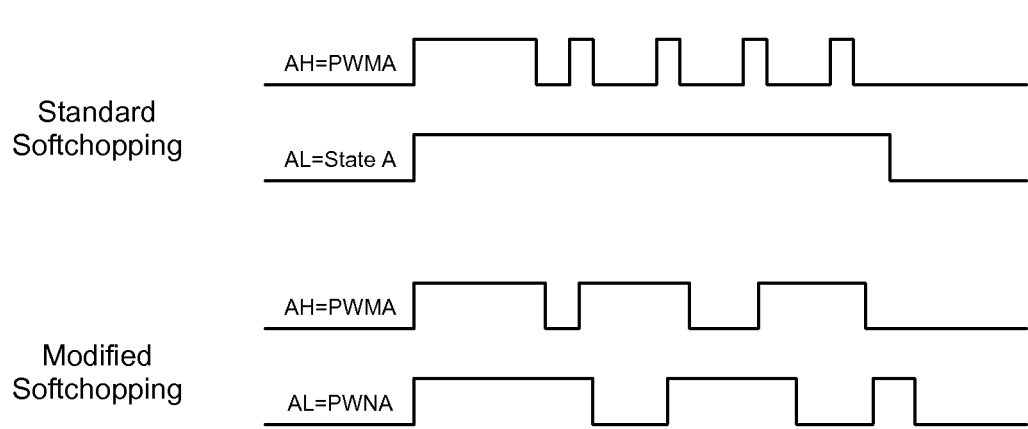
FIG. 5 is a graphical view of a typical soft chopping waveform as compared with an exemplary distributed soft chopping waveform.

As further demonstrated by the exemplary power converter circuit 122 of FIG. 4 and the corresponding waveforms of FIG. 5, the distributed soft chopping routine of step 140-5 may be a modification of standard soft chopping routines commonly used in the art. In standard soft chopping routines, only an upper or a first switch 132-1 of a phase leg is pulsed, or opened and closed, at a required frequency while a lower or a second switch 132-2 is continuously held in the closed position. Moreover, only the first switch 132-1 is switched or driven by a pulse width modulated (PWM) signal in standard soft shopping routines. Soft chopping routines may typically be used to drive a switched reluctance motor 110 at zero or relatively low speeds for high current applications requiring substantially more torque output. Such high current applications place a substantial burden and significant thermal stress upon only one of the two switches 132-1, 132-2 that is constantly being used for switching, thus often resulting in premature failures.

However, the distributed soft chopping routine shown in FIG. 5 may distribute the switching pattern of high phase currents between both the first and second switches 132-1, 132-2 so as to more evenly distribute the thermal stress, and to alleviate the overall burden on the power converter circuit 122. As shown, each of the first and second switches 132-1, 132-2 may be driven by two distinct and generally alternating PWM gate signals. For example, the controller 130 may be configured to transmit a first PWM gate signal for driving the first switch 132-1 and a second PWM gate signal for driving the second switch 132-2. More specifically, the first and second PWM signals may be configured to be generally alternating such that at least one of the first and second switches 132-1, 132-2 is closed at any point during the distributed soft chopping routine, and such that both first and second switches 132-1, 132-2 are never simultaneously open for the duration of the soft chopping routine. Furthermore, the PWM signals may be configured such that each pulse segment of the standard soft chopping routine, such as the first waveform of FIG. 5, generated by switching only the first switch 132-1 is effectively matched in the distributed soft chopping routine, such as the second waveform of FIG. 5, generated by switching both first and second switches 132-1, 132-2. Accordingly, the controller 130 may further be configured to generate PWM signals which preserve the effects of standard soft chopping routines while promoting the overall longevity of the converter circuit 122 and the electric drive system 104.

INDUSTRIAL APPLICABILITY

In general, the foregoing disclosure finds utility in various industrial applications, such as the fanning, construction and mining industries in providing smoother and more efficient control of motors typically used in association with work vehicles and/or machines, such as tractors, backhoe loaders, compactors, feller bunchers, forest machines, industrial loaders, skid steer loaders, wheel loaders, and the like. More specifically, the disclosed control systems and methods may be applied to electric drive systems and machines having switched reluctance motors or other comparable motors commonly used in the art. The systems and methods disclosed herein provide an efficient strategy for driving electric motors which aims to preserve the health of an associated electric drive system and prolong machine performance. Moreover, a distributed soft switching strategy is provided for driving switched reluctance motors during a motoring or propulsion mode of operation at zero or relatively low motor speeds. By more evenly distributing the task of soft chopping to more than one switch per phase of the motor during high current and high load applications, component failures caused by thermal stress are reduced. Furthermore, by alternating the task of switching between all of the switches of the power converter circuit, efficiency is improved while preserving the effective functionality of standard soft chopping strategies.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A method of controlling a motor, comprising the steps of:
   determining a speed of the motor; and
   engaging a soft chopping routine on a first switch and a second switch of each phase if the motor speed is relatively low, the first switch being driven by a first pulse width modulated (PWM) signal and the second switch being driven by a second PWM signal, the first and second PWM signals being alternatingly configured such that at least one of the first switch and the second switch is closed at any point during the distributed soft chopping routine and both the first switch and the second switch are never simultaneously open, relatively low motor speeds corresponding to motor speeds approximately ranging between zero and a base speed, the base speed being a maximum speed at which the motor is able to output constant torque before torque output begins to decrease proportionally with motor speed; and
   engaging a single pulse routine on the first switch and the second switch if the motor speed is relatively high, and engaging a hard chopping routine on the first switch and the second switch if the motor speed is nominal, relatively high motor speeds being approximately greater than the base speed and nominal motor speeds approximating the base speed.

2. The method of claim 1, wherein the first and second PWM signals are distinct.

3. The method of claim 1, wherein the motor is a low to medium voltage three-phase switched reluctance motor operable in one of a generating mode and a motoring mode of operation.

4. The method of claim 3, wherein the distributed soft chopping routine is engaged during the motoring mode of operation.

5. A control system for a motor, comprising:
   a converter circuit operatively coupled to a stator of the motor, the converter circuit including at least a first switch and a second switch coupled to each phase of the stator; and
   a controller in communication with each of the motor and the converter circuit, the controller configured to determine a motor speed, and engage the first switch and the second switch with a soft chopping routine during a motoring mode of operation at relatively low motor speeds, the first switch being driven by a first pulse width modulated (PWM) signal and the second switch being driven by a second PWM signal, the first and second PWM signals being alternating signals such that both the first switch and the second switch are never simultaneously open, the controller further being configured to engage the first switch and the second switch with a hard chopping routine if the motor speed is nominal, and engage the first switch and the second switch with a single pulse routine if the motor speed is relatively high, relatively low motor speeds corresponding to motor speeds approximately ranging between zero and a base speed, nominal motor speeds approximating the base speed, relatively high motor speeds corresponding to motor speeds approximately greater than the base speed, the base speed being a maximum speed at which the motor is able to output constant torque before torque output begins to decrease proportionally with motor speed.

6. The control system of claim 5, wherein the first PWM signal is distinct from the second PWM signal.

7. The control system of claim 6, wherein the controller is configured to alternate the first and second PWM signals such that at least one of the first switch and the second switch is closed at any point during the distributed soft chopping routine.

8. The control system of claim 5, wherein the converter circuit includes insulated-gate bipolar transistor switches.

9. The control system of claim 5, wherein the soft chopping routine is preprogrammed in a memory accessible to the controller.

10. The control system of claim 5, wherein the controller is adapted for use with an electric drive having a low to medium voltage three-phase switched reluctance motor operable in one of a generating mode and a motoring mode.

11. An electric drive system, comprising:
an electric motor having a rotor and a stator, each of the rotor and the stator having a plurality of phases;
a converter circuit in communication with the motor, the converter circuit including at least a first switch and a second switch coupled to each phase; and
a controller in communication with each of the motor and the converter circuit, the controller configured to determine a motor speed, and engage the first switch and the second switch with a soft chopping routine during a motoring mode of operation at relatively low motor speeds, the first switch being driven by a first pulse width modulated (PWM) signal and the second switch being driven by a second PWM signal, the first and second PWM signals being alternating signals such that both the first switch and the second switch are never simultaneously open, the controller further being configured to engage the first switch and the second switch with a hard chopping routine if the motor speed is nominal, and engage the first switch and the second switch with a single pulse routine if the motor speed is relatively high, relatively low motor speeds corresponding to motor speeds approximately ranging between zero and a base speed, nominal motor speeds approximating the base speed, relatively high motor speeds corresponding to motor speeds approximately greater than the base speed, the base speed being a maximum speed at which the motor is able to output constant torque before torque output begins to decrease proportionally with motor speed.

12. The electric drive system of claim 11, wherein the first PWM signal is distinct from the second PWM signal.

13. The electric drive system of claim 12, wherein the controller is configured to alternate the first and second PWM signals such that at least one of the first switch and the second switch is closed at any point during the distributed soft chopping routine.

14. The electric drive system of claim 11, wherein the soft chopping routine is preprogrammed in a memory accessible to the controller.

15. The electric drive system of claim 11, wherein the motor is a low to medium voltage three-phase switched reluctance motor operable in one of a generating mode and a motoring mode.

16. The electric drive system of claim 11, wherein the controller is configured to select one of the single pulse, hard chopping and distributed soft chopping routines based at least partially on the detected motor speed and using one or more control maps preprogrammed in a memory accessible to the controller.

* * * * *